US007779356B2

(12) United States Patent
Griesmer

(10) Patent No.: US 7,779,356 B2
(45) Date of Patent: Aug. 17, 2010

(54) ENHANCED DATA TIP SYSTEM AND METHOD

(76) Inventor: James P. Griesmer, 20217 118th St. SE., Snohomish, WA (US) 98290

( * ) Notice: Subject to any disclaimer, the term of this patent is extended or adjusted under 35 U.S.C. 154(b) by 822 days.

(21) Appl. No.: 10/723,824

(22) Filed: Nov. 26, 2003

(65) Prior Publication Data

US 2005/0114779 A1    May 26, 2005

(51) Int. Cl.
*G06F 13/00* (2006.01)
*G06F 3/00* (2006.01)
*G06F 15/00* (2006.01)
*G06F 3/048* (2006.01)

(52) U.S. Cl. .................. 715/711; 715/705; 715/708; 715/715

(58) Field of Classification Search ................ 715/711, 715/859, 860, 861, 705, 708, 715
See application file for complete search history.

(56) References Cited

U.S. PATENT DOCUMENTS

| | | | | |
|---|---|---|---|---|
| 6,467,081 B2 * | 10/2002 | Vaidyanathan et al. | ...... | 717/123 |
| 6,542,163 B2 | 4/2003 | Gorbet et al. | ............... | 345/711 |
| 6,636,250 B1 * | 10/2003 | Gasser | ...................... | 715/853 |
| 7,296,230 B2 * | 11/2007 | Fukatsu et al. | ............... | 715/711 |
| 7,322,023 B2 * | 1/2008 | Shulman et al. | ............. | 715/705 |
| 2003/0163801 A1 * | 8/2003 | Thames et al. | .............. | 715/513 |
| 2004/0250175 A1 * | 12/2004 | Draine et al. | ................. | 714/46 |
| 2005/0028107 A1 * | 2/2005 | Gomes et al. | ............... | 715/762 |

OTHER PUBLICATIONS

Cooper, Deborah, Display complete listbox entries in a tooltip similar to VB help, Mar. 2001, Rochester, vol. 11, p. 1.*
Jack, R., "Tiptoe through the ToolTips with our All-Encompassing ToolTip Programmer's Guide", *Microsoft Systems Journal*, Apr. 1997, www.microsoft.com/msj/0497/tooltip/tooltip.aspx, 17 pages.

* cited by examiner

*Primary Examiner*—William L Bashore
*Assistant Examiner*—Jordany Núñez
(74) *Attorney, Agent, or Firm*—Woodcock Washburn LLP

(57) ABSTRACT

Displaying data sub-items corresponding to a cursor-selected object displayed on a computer screen involves determining that a cursor is positioned to point at an object on the computer screen, loading the cursor-selected object, evaluating the cursor-selected object to determine it has a fixed value, has related data sub-items or if the related data sub-items are capable of expansion into lower-tier sub-items. The values for the object and the related data sub-items are assembled and displayed in a window that indicates the values of the object and the related data sub-items along with an indication of a presence of lower-tier sub-items which can in turn be further examined.

20 Claims, 9 Drawing Sheets

ENHANCED DATA TIP SYSTEM AND METHOD

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

The present invention relates generally to data processing systems and, more particularly, to the displaying of underlying and related information in application programs.

BACKGROUND OF THE INVENTION

The display of data in a simple, logical and convenient form is a constant challenge as data processing systems continue to develop in complexity and as the amount of data presented increases. One approach to data presentation has been to display only the data requested and allow any deriving information to be suppressed. For example, if one desires to see a financial valuation balance, an application program may display the balance but the individual elements of the balance, such as cash available, values of investments, inventory, and the value of accounts receivable may be displayed on another display page that a developer or an application user must summon to view. Often, this request to see the underlying deriving data results in the user changing display windows and requires some level of mental agility to correlate data while swapping screens between data display views. There are many examples of applications where a desire to see data underlying the results on one window necessitates switching to another window. One such application is present in a software development environment where a debugger program is used to test code for new software.

Debuggers are software utilities that are commonly used to develop and test software by invoking a powerful tool that allows program developers to observe the run-time behavior of their programs to determine the location and characteristics of semantic errors. One common task that is performed while debugging is checking the value of variables. Commonly, a developer must stop his program at a break point, switch to a tool such as a watch window or other type of viewer and type in a variable name to uncover the value of a variable. This action may be cumbersome in some circumstances.

Microsoft® Visual C++ 4.0, available from Microsoft Corporation, One Microsoft Way, Redmond, Wash. 98052, utilizes a feature called data tips to provide easy access to variable values. The data tips feature was inspired by the tool tips popularized by other Microsoft® products such as Microsoft Office™. Data tips are a convenient feature that allows a developer to see the value of a variable, data structure, and expression in source code simply by moving a mouse cursor or other user pointing device over the variable in the source code. This can avoid the cumbersome activity of switching between windows or display screens to view data already in the application.

Currently, when debugging an application, the user may hover a mouse or other pointing mechanism over a variable name to read the expression under the cursor. The debugger then attempts to evaluate it and a data tip appears with the expression and a single line indicating the value. When the user moves the mouse far enough away, or pauses for 60 seconds, the data tip automatically disappears. This makes it quick and easy for a user to examine the status of his program without restoring to excessive window manipulation and/or typing. Although the data tips implementation in debugger programs is useful, it falls short of true interactive capability.

It is commonly believed that much of the functionality of a debugger is underutilized due to complexity. If the debugger functionality were brought closer to the user through the use of interactive data tips, then the user experience could be enhanced. The editor function is believed to be the area where most developers spend large amounts of time. Also, data tips are one of most frequently used and easily understood debugger tools. If data tips were enhanced to provide interactive capabilities, then an enhanced data tips feature may improve the software development cycle time as well as improve user interaction.

Thus, there is a need for a method and system which can efficiently perform both examination and editing tasks for objects such as variables in a software development system to reduce software development cycle time and enhance user interaction. The present invention addresses the aforementioned needs and solves them with additional advantages as expressed herein.

SUMMARY OF THE INVENTION

A method for indicating the values of variables in a program under development includes detecting the position of a pointer on a computer display associated with an expression in the program under development, reading and evaluating the expression, and displaying at least one item value in a first item window, the item value associated with a variable in the expression. The display also provides an indication of at least one sub-item value associated with the variable when such a value is present. The display also allows a user to request for specific sub-item values and responds by displaying the first sub-item window containing the first sub-item value, the first sub-item window being separate from the first item window.

A method of displaying any related data sub-items corresponding to a cursor-selected object displayed on a computer screen includes determining that a cursor is positioned to point at the cursor-selected object on the computer screen, loading the cursor-selected object, evaluating the cursor-selected object to determine if the object has a fixed value or has related data sub-items, or if the related data sub-items are capable of expansion into lower-tier sub-items. The method then includes assembling values for the cursor-selected object and the related data sub-items and displaying the values of the cursor-selected object and the related data sub-items along with an indication of a presence of the lower-tier sub-items.

A system supporting the above methods for displaying data tips related to a cursor-selected object displayed on a computer screen includes a computer screen to display a cursor-selected object and data tips and a processor for executing instructions corresponding to the above-mentioned methods. The display of the values of the cursor-selected object and related sub-items in the data tips uses a window located adjacent to the cursor-selected object; the window having an indication of the lower-tier sub items if the lower-tier sub-items exist.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
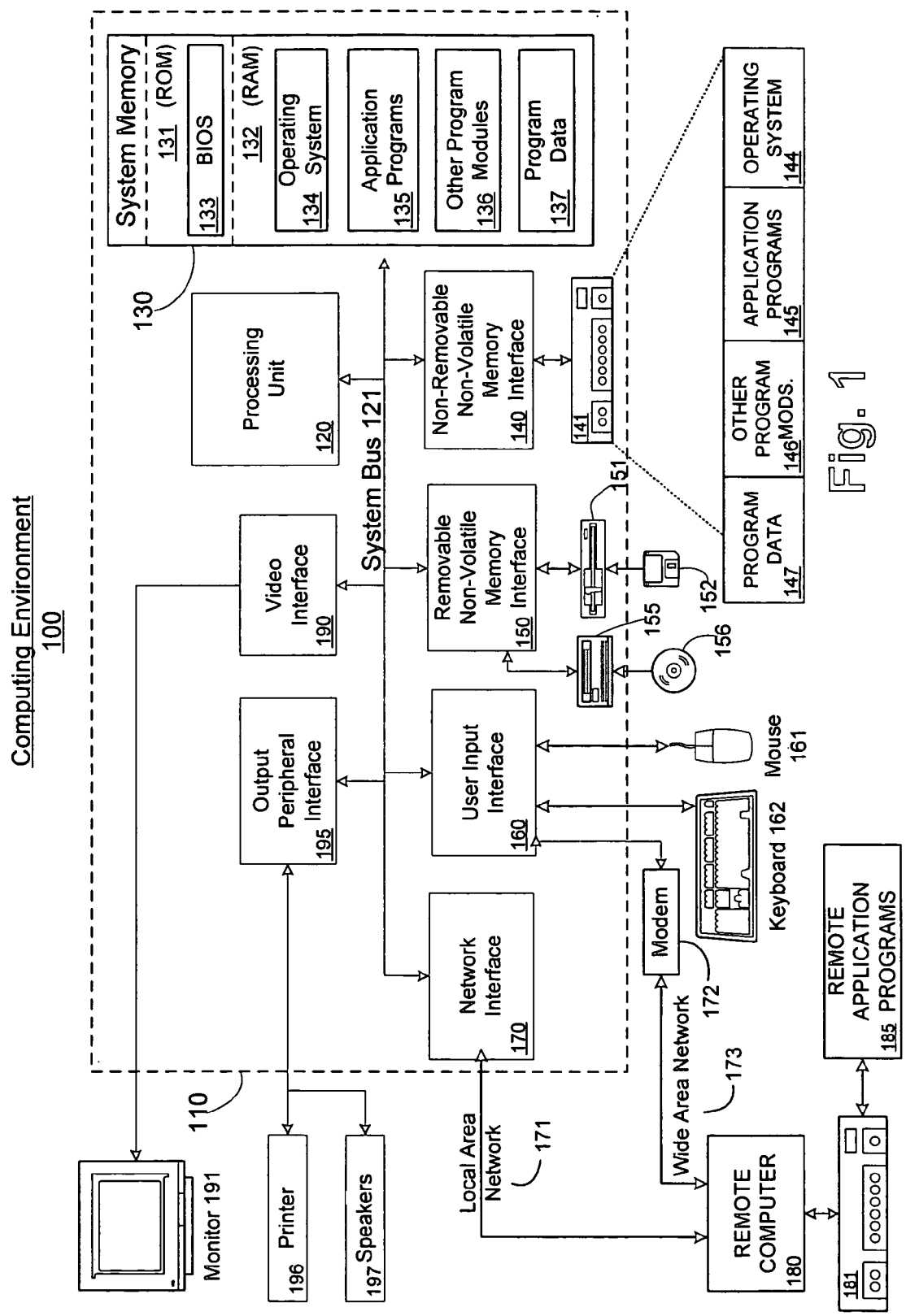
FIG. 1 is a block diagram showing an exemplary computing environment in which aspects of the invention may be implemented.

The invention relates to enhanced data tips, which are an extension of the currently known data tips functionality in programs such as debuggers. In many cases, a single line of information as is currently displayed by the present data tips implementation is not enough. The present invention addresses this issue by incorporating an innovative auto-expand mechanism that allows the user to expand any expandable item and view the resulting information. The invention has several advantages in that it includes the ability to expand the information to view 'child' or sub-item data, which would also include further expandability if deeper information is associated with the sub-item data. This results in instant availability of a full expansion tree of data tips to the developer.

The preferred embodiment of the present invention displays a data tip when a mouse cursor points to a variable for a sufficient amount of time. The functionality of the invention is useful, for example, while using a debugger during software development. Upon activation, the invention reads the expression under the cursor and evaluates it. If the expression can be evaluated, then a data tip appears with the expression and a window indicating its value. The window may indicate that a further breakdown of the variable is possible. Once selected, the further breakdown provides a second window that displays more variable values. These additional variable values may be "child" items to the "parent" expression or member fields. The terms item and sub-item may be used analogously with parent and child respectively. If member fields required for display are larger than the area available for display on the computer screen, scrolling devices appear which allow the user to move around in the field to examine the contents. Multiple levels of expansion are possible.

Data tips allow access to the variables such that the variables may be edited or displayed in a different format. If a user wishes to view information obscured by the presence of the data tip, the user may select the data tip to become transparent thus revealing the once-obscured screen information.

Although the preferred embodiment of the present invention concerns the evaluation of expressions and the presentation of variables in a debugger application, those skilled in the art will appreciate that the present invention may generally be applied to other applications where a computer display of underlying data may be useful. The user interface model of the present invention may be useful anywhere a hierarchy of data is encountered by the user. In particular, the invention is an alternate representation of a tree view occupying less screen real-estate. As such, the invention may be generally easier to manage when data viewing is the primary objective. Accordingly, the invention has many applications in data display wherein the information to be displayed may be any number, text, expression, code or any other type of information stored in a computer. Other implementations of the invention may include, for example, accounting software where underlying transactions, expressions, or data values may be useful for a user to see while performing the operations provided by an application. It should be appreciated that the present invention may be applied to multiple types of data display needs.

After discussing an exemplary computing environment in conjunction with FIG. 1 in which the invention may be practiced, exemplary embodiments will be discussed in detail in conjunction with FIGS. 2-9.

Exemplary Computing Device

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW) digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of NET's languages and services, and in other distributed computing frameworks as well.

Exemplary Embodiments

One exemplary embodiment of the invention is that of an enhanced data tip for an application program such as a debugger. This example is useful to an understanding of the invention because it may be used to demonstrate how the basic principles of the invention may be used to advantage to reduce excessive user screen changes to perform multiple types of functionalities within an application program. Although the invention may be utilized with other applications, such as scientific analysis programs, scheduling programs, accounting programs to name a few, the exemplary embodiment of a debugger will be discussed.

Figure 2:
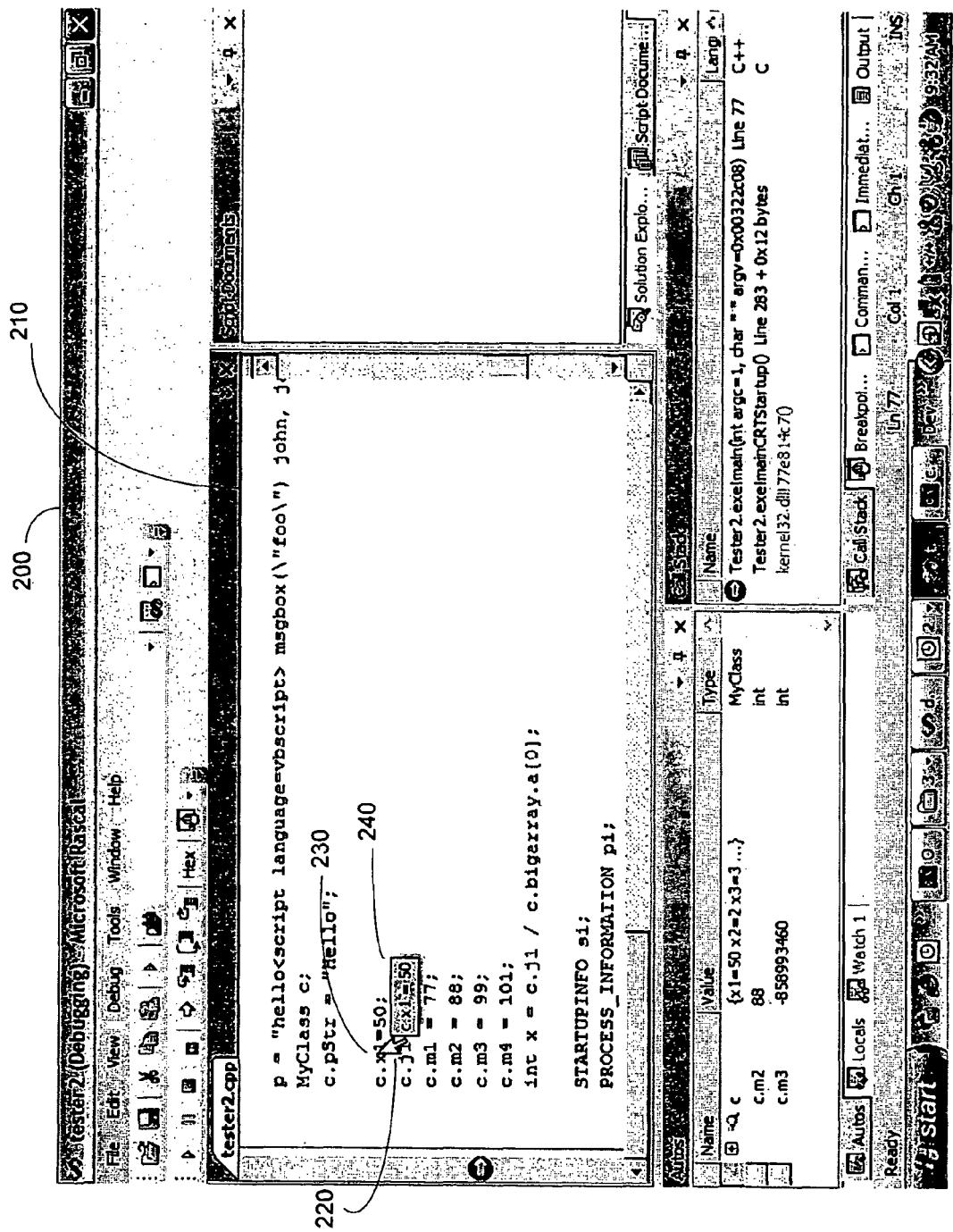
FIG. 2 is an exemplary representation of a screen shot representing an unexpanded data tip in a debugger application.

FIG. 2 depicts a screen shot of a development system program debugger. The user interface screen 200 allows a user to view the status of a program at a break point inserted into the program. The break point allows the runtime status of variables, structures, expressions, and other attributes to be examined as part of the debugging process. A pointer mechanism, such as a mouse, roller ball, track ball, light pen, or other equivalent device allows a user to control the position of a pointer 220 anywhere on the interface screen 200. In the debugger embodiment example of FIG. 2, although the entire screen 200 may be traversed by the pointer, the program of interest lies in application window 210.

In the embodiment of FIG. 2, the user is assumed to have started debugging his program and hits a breakpoint. Note that an expression 230, reading "c.x1=50", among others, is displayed. The user may wish to see the values of various aspects of the expression. To do so, the user hovers his cursor or other pointing mechanism over the "x" in the expression "c.x1". In less than a second, the data tip 240 appears. The behavior is almost identical to that of an existing data tip implementation except that the user is able to move the mouse over the data tip to interact with it as shown in following Figures. In addition, the new data tips have no timeout for when they automatically disappear. This is an improvement over the existing data tips, which would automatically disappear after about 60 seconds. The existing data tips are implemented as standard tool tips, not a custom user interface control as in the implementation of the current debugger embodiment.

Figure 3:
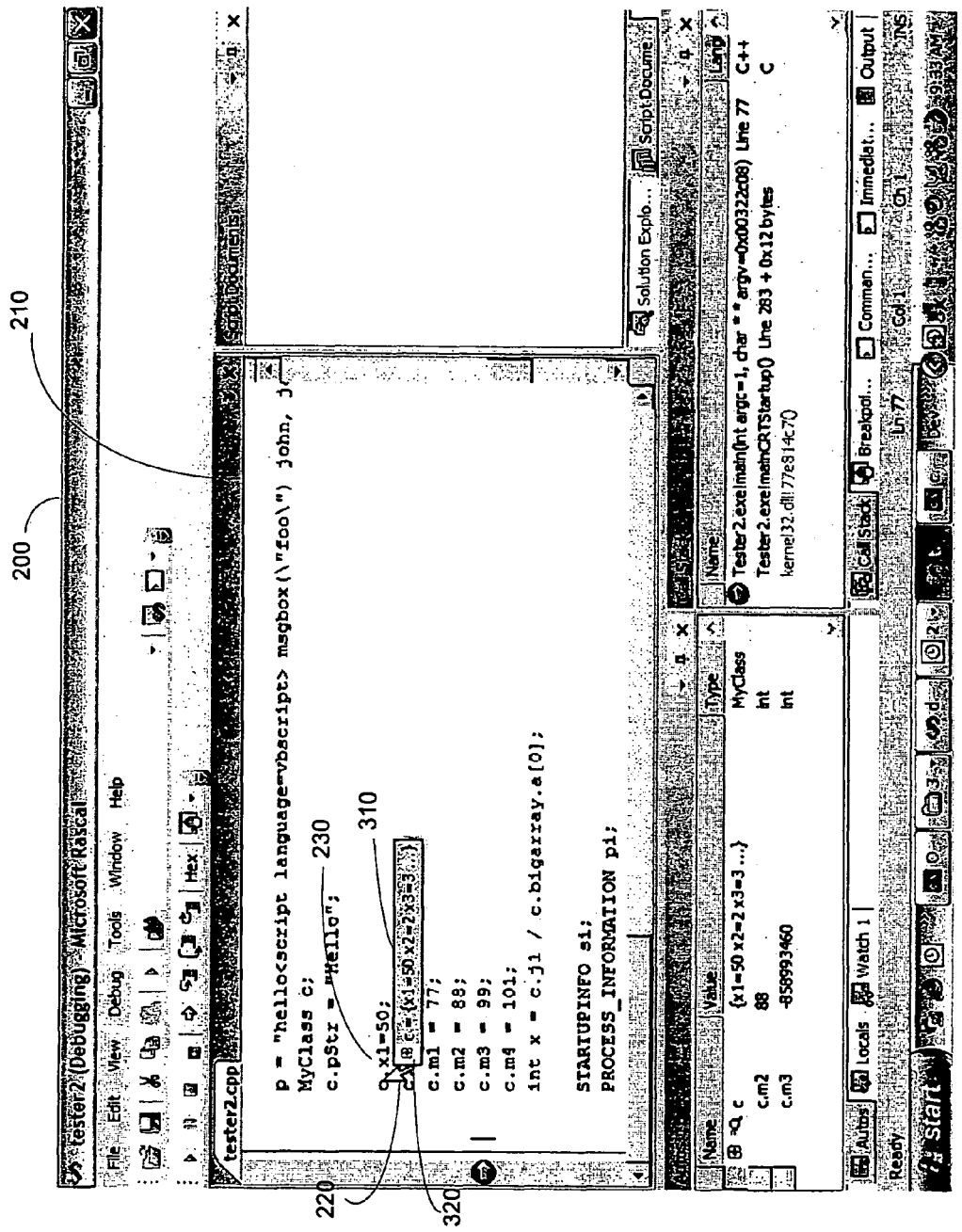
FIG. 3 is an exemplary representation of a screen shot representing the expansion of a variable as an aspect of the invention.

FIG. 3 depicts a user interface screen 200 of FIG. 2 with the debugger application window 210 except that here, the user hovered the mouse cursor 220 over the "c" in the "c.x1" expression 230. A breakdown of the variable "c" in expression 230 has components different from that of "x" in FIG. 2 and a new data tip window 310 is displayed to indicate the content of variable "c". The user may note that variable "c" has sub-items because of the presence of a "+" 320 in the left hand portion of data tip 310. The "+" indication is an expansion widget. This expansion widget allows the user to see additional information associated with the selected variable.

Figure 4:
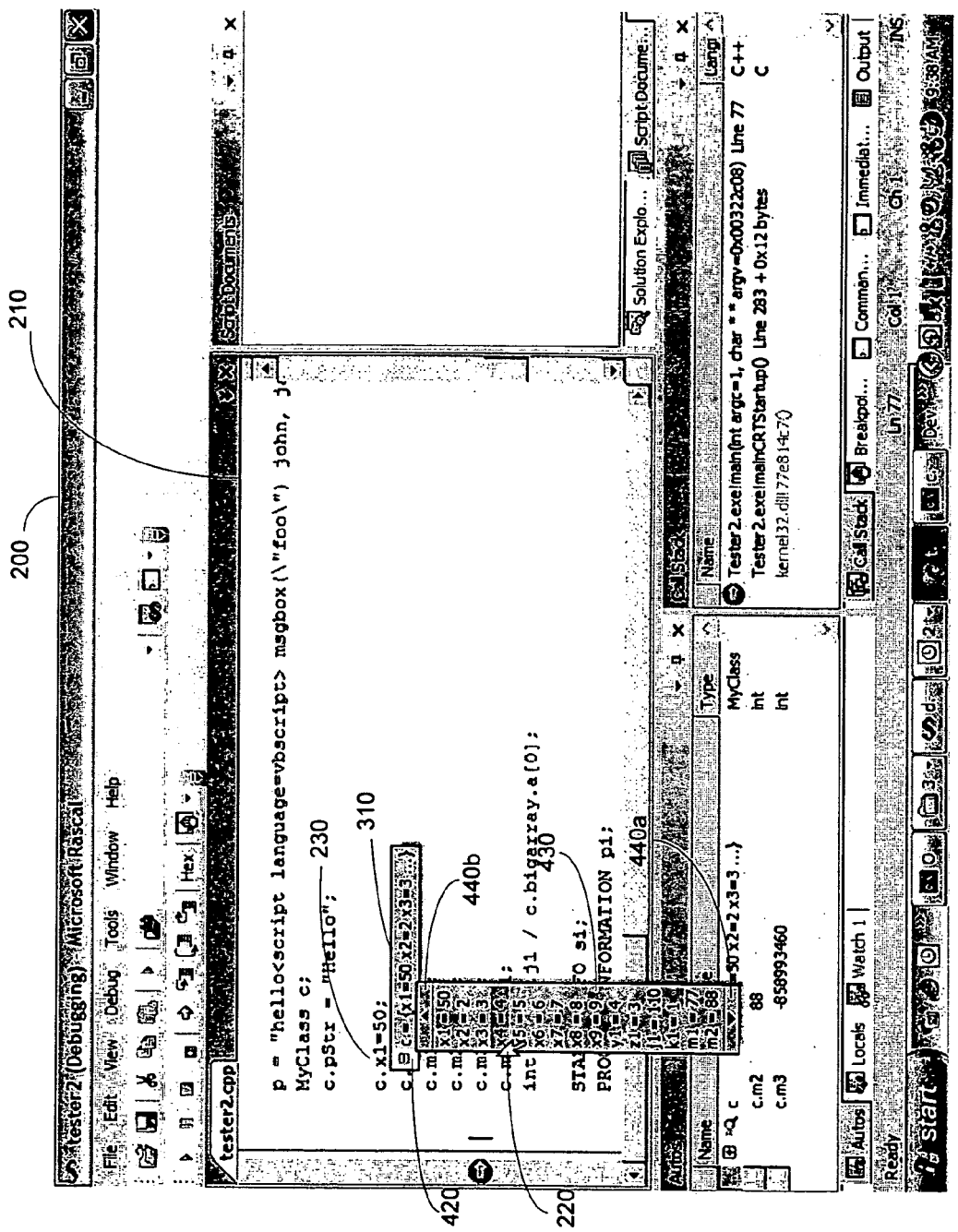
FIG. 4 is an exemplary representation of a screen shot representing the further expansion of a variable as an aspect of the invention.

For example, if the user hovers over the expansion widget, a new data tip may be displayed, for example, just down and to the right of the first data tip. FIG. 4 depicts the user interface screen 200 of FIG. 3, using the same application window 210. Here, the user is assumed to have hovered the mouse over the "+" widget in the data tip 310 shown in FIG. 3. After a short timeout of roughly less than a second, or immediately when the user clicks the "+" widget, the list of sub-items in a new data tip may be displayed. This data tip 430 shows the list of data members of the original expression and their values. Notice that data tip 310 has been modified because a "−" widget 420 is displayed in the left hand corner of data tip 310. This indicates to the user that there is no further expansion of the variable "c" because it is shown in the new data tip window 430.

While this behavior is similar to the behavior of the existing watch windows in the debugger, it differs in a significant manner. The sub-items or "child" members are displayed in their own window. That concept has several significant advantages. One is that less screen real-estate may be covered than if the expansion happened within one window. Depending on the data being shown, this savings can be significant.

Another advantage is that the separate window can be individually scrolled. Therefore, the original item or variable will always remain visible. In the current example, the data tip for variable "c" 310, which may be termed the "parent" node or variable, remains visible during the generation of new expansion window 430. As another aspect of the same invention, the child window 430 may disappear automatically if the user moves the mouse back over top of the parent node 310, allowing the user to quickly inspect multiple children without excessive scrolling and window manipulation.

Returning to FIG. 4, since there are more than 15 sub-items in the example data tip 430, scroll widgets 440*a* and 440*b* may be placed at the bottom and top of the new data tip 430. Note that scroll widget 440*a* is darkened as it represents that additional data lies below. Conversely, scroll widget 440*b* is not dark as it represents that no additional data is available to the user if he scrolls in the up direction. As the user moves the cursor 220 down over the new data tip 430, the closest sub-item is highlighted. This helps provide an ability for the user to see name-value pairs which may become quite long and difficult to match up by eye alone.

Figure 5:
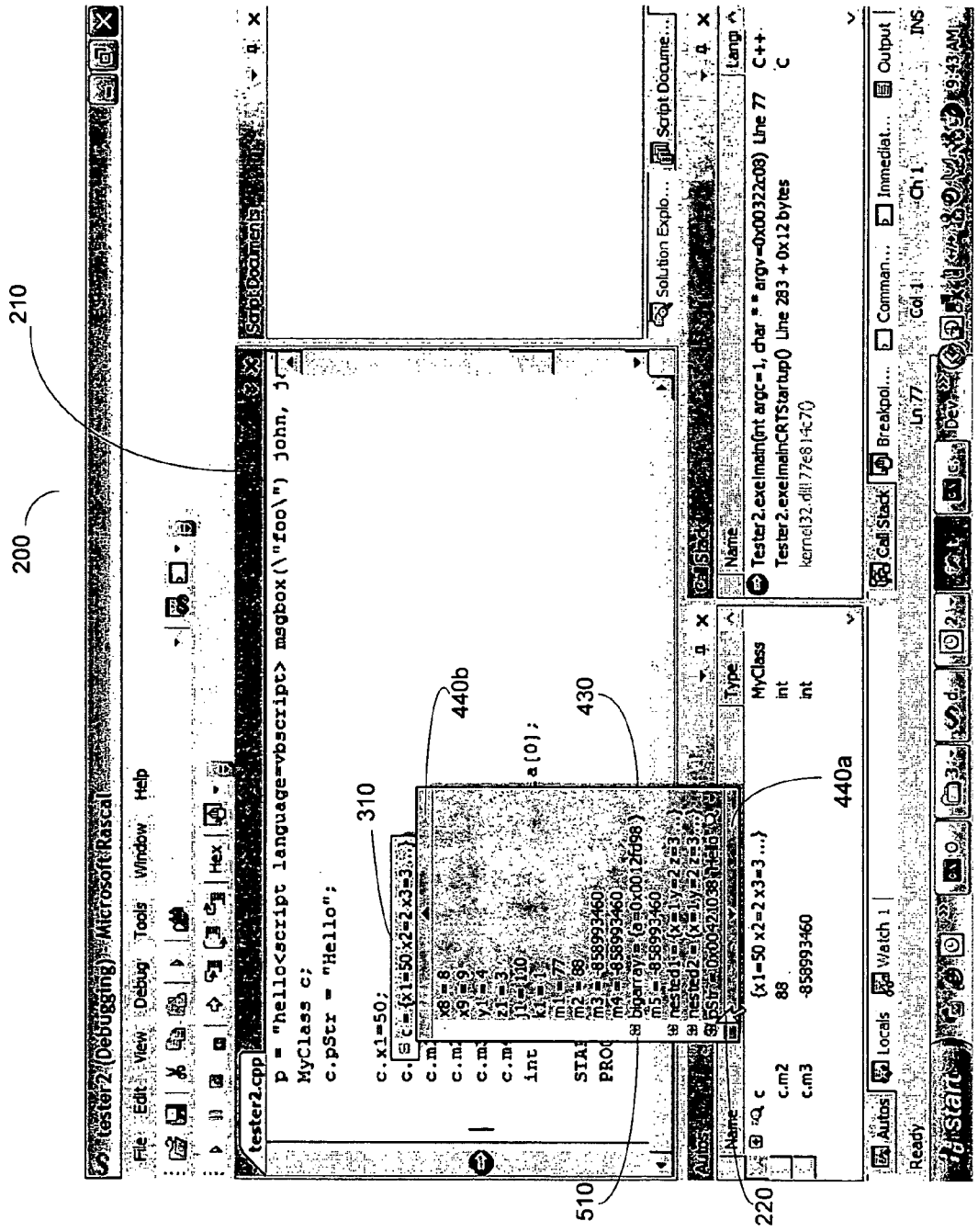
FIG. 5 is an exemplary representation of a screen shot representing the lower data elements of an expansion of a variable as a further aspect of the invention.

FIG. 5 depicts the screen shot of FIG. 4 but scrolled using scrolling widget 440*a* to reveal the last sub-item within the variable "c". Note that the data tip 430 has grown in width to compensate for newly encounter expandable sub-items, such as bigarray 510. Overall, the data tip 430 and has grown to display the entire value of each visible sub-item. Note that in FIGS. 4 and 5, screen real-estate is preserved as much as possible by sizing the data tip 430 so as to not cover any other screen element the user may find helpful while displaying the data tip 430. However, the present invention provides a method to view items obscured by a data tip.

Figure 6:
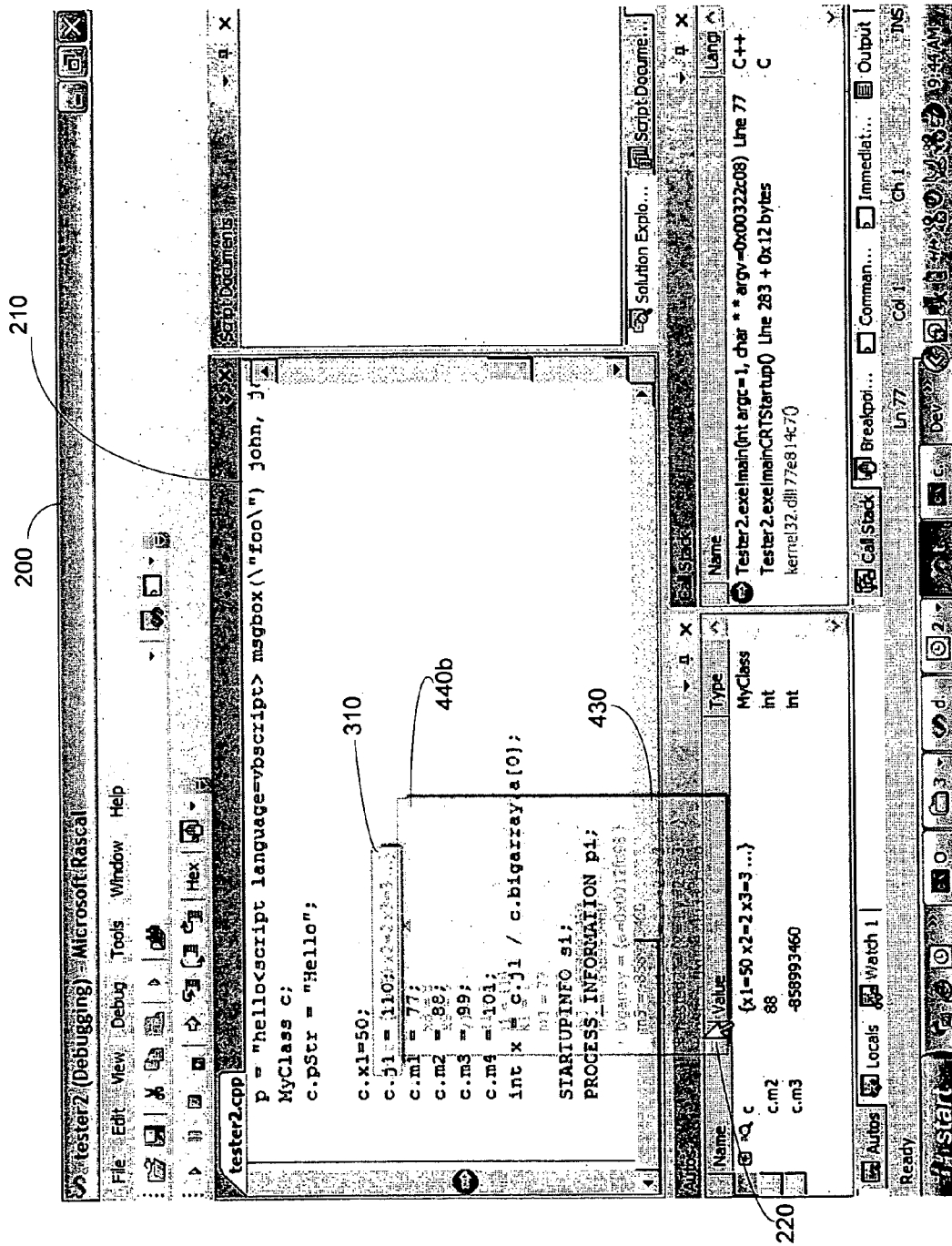
FIG. 6 is an exemplary representation of a screen shot representing the transparency aspect of the invention.

FIG. 6 depicts an aspect of the current invention that allows a user to view information on screen 200 that has been obscured by the presence of a data tip. FIG. 6 depicts the view of FIG. 5 where the user has a desire to see what lies underneath the data tip without dismissing the data tip and thus losing the information displayed thus far. Using the current invention, the user may depress a pre-defined control key or other control mechanism, such as an alternate mouse button, and the data below the data tips 310 and 430 may be viewed because the data tips become transparent. Note that transparency allows the user to see the underlying information of screen 200 but also allows the user to view the boundaries of the now-transparent data tips 310 and 430. To exit transparency mode, a user may either release the depressed control key or depress another control key or function to restore the data tips 310 and 430 to the pre-transparent condition shown in FIG. 5.

Figure 7:
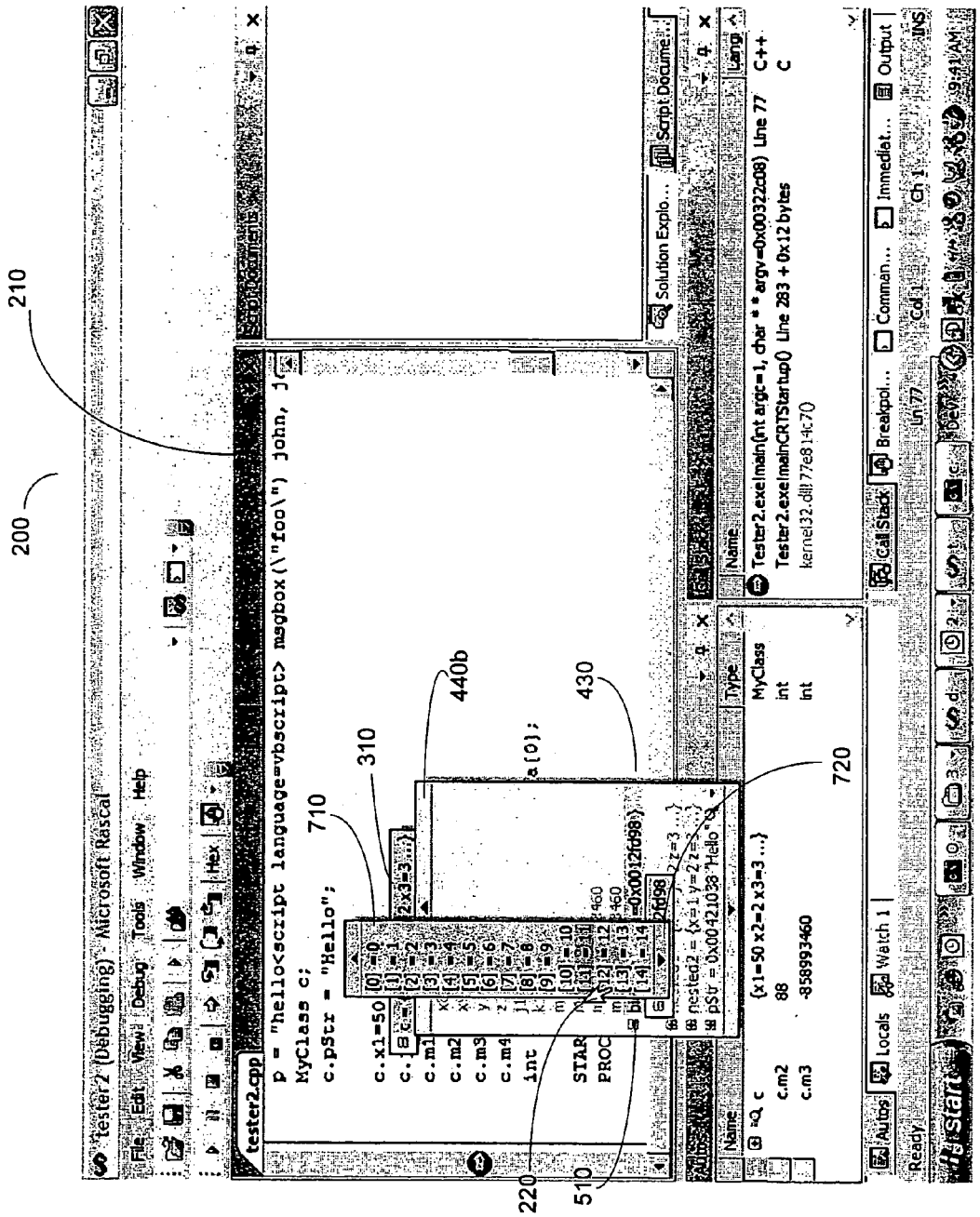
FIG. 7 is an exemplary representation of a screen shot representing a further expansion of a sub-variable as an aspect of the invention.

FIG. 7 depicts the display of FIG. 5 except expanded to view the sub-item called bigarray 510. In this expansion, there is not enough room to display the entire new data tip 710 without hitting the bottom of the screen. Therefore, the new data tip 710 is moved to a position above the cursor 220. Note also that a new scroll widget 720 may be produced to indicate that more data is available below the last entry of the data tip window 710. Navigation back between data tips 710, 430, and 310 is possible by depressing pre-selected key, such as the left-arrow or backspace key. Alternately, the user may position the cursor to hover outside the boundaries of the active data tip until it disappears.

Figure 8:
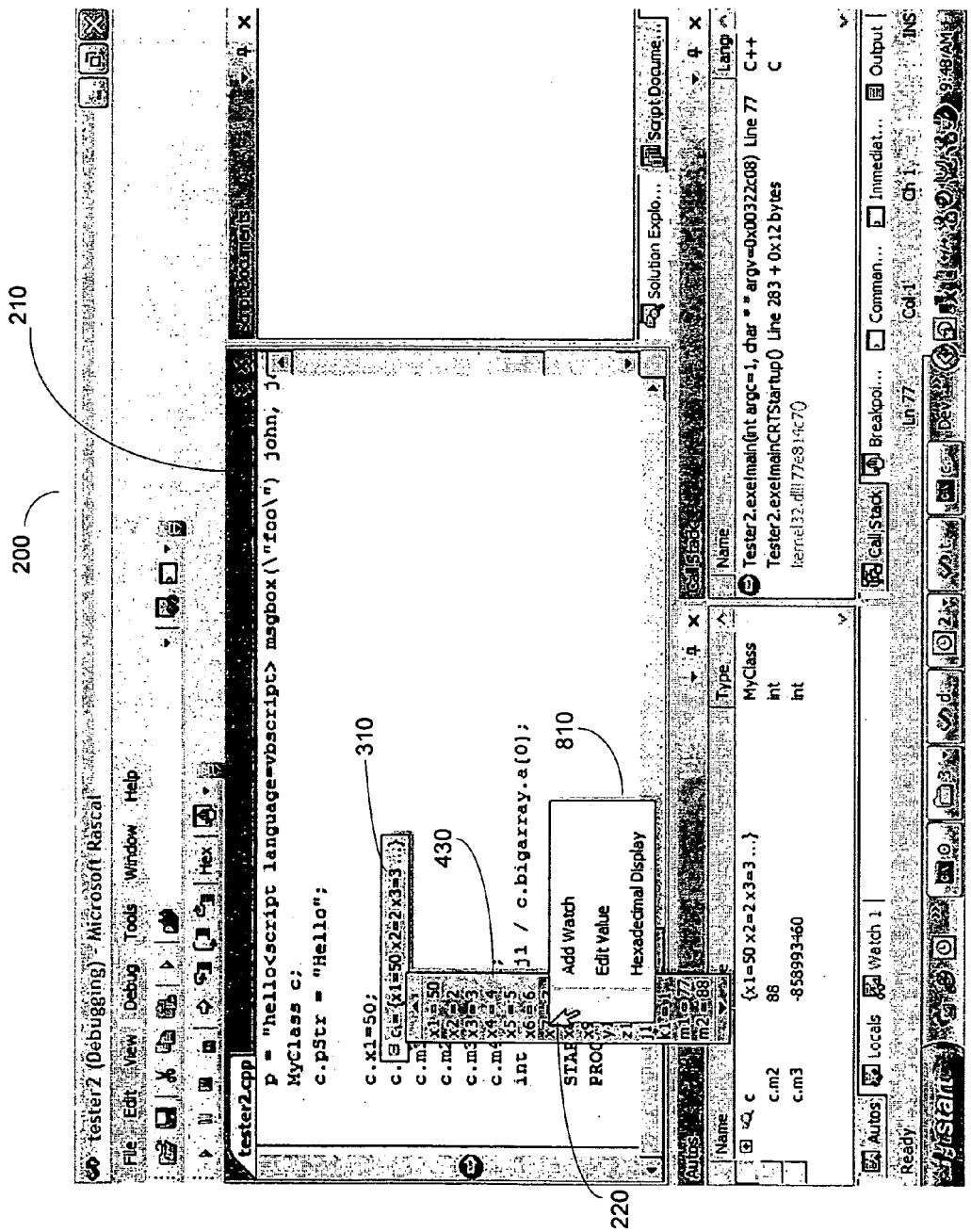
FIG. 8 is an exemplary representation of a screen shot representing the editor aspect of the invention.

FIG. 8 depicts the display of FIG. 4 and showing additional functionality of the invention. Referring to FIG. 8, the user may wish to edit a sub-item of data tip 430. To accomplish this, the user would depress a preselected control key or other equivalent pointer control such as a mouse button while pointing to a selected sub-item and the data tip selection window 810 would appear. The data tip selection window 810 may be a menu of the current set of operations that can be performed for the selected sub-item. In the FIG. 8 example of functional menu options, the currently selected sub-item can be added to the watch window, or it can be edited, or it can be changed to be displayed in hexadecimal rather than decimal form. Other menu selections are possible as well including but not limited to copy, paste, change to binary, decimal or other editing and display functions such as a display in simple text, XML, HTML or a custom viewer/editor.

In another embodiment, editing of variables may occur as desired by the user by moving the mouse or other pointer mechanism over individual sub-items. Then, smart-tag indicators may appear under the items. Clicking on these tags may allow the user to edit values or add an item to a watch window, among other things.

A representation of the class structure and code implementing the exemplary embodiment of the enhanced data tips application to a debugger type of application program is provided below. The windows themselves may be implemented by a CDataTipWnd and CDataTipChildWnd class. The information within the tips themselves are implemented as an array entitled (CDataTipArray) of CDataTipInfos.

```
//***********************
// CDataTipInfo - One of these objects represents each line of a data tip.
//***********************
struct CDataTipInfo
{
    CStringW m_strExpression;
    CStringW m_strName;
    CStringW m_strValue;
    CStringW m_strTipText;
};
//***********************
// CDataTipArray - An array of CDataTipInfos
//***********************
class CDataTipArray
{
    dbg::dynarray<CDataTipInfo*, int> m_privDataTipInfos;
    int m_cntTotalAvailable;
public:
    CDataTipArray( ) : m_cntTotalAvailable(0) { }
};
//***********************
```

-continued

```
// CDataTipWnd - This is the main data tip window. It provides base implementation for all data
tips. At the lowest level, it is a straight window that is custom drawn and hit-tested.
//********************
class CDataTipWnd : public CWindowImpl<CDataTipWnd, CWindow,
CWinTraits<WS_POPUP | WS_BORDER, WS_EX_TOOLWINDOW |
WS_EX_NOACTIVATE | WS_EX_TOPMOST | WS_EX_LAYERED>>,
        public CComObjectRoot,
        public IOleCommandTarget,
        public IOleComponent
{
    CDataTipWnd* m_pParent;
// The top-most tips do not have parents. All other data tips do.
    CDataTipChildWnd* m_pChild;
// If a data tip has children, this is set.
    CDataTipArray m_aDataTipInfos;
// The set of data is displayed by this data tip.
};
//********************
// CDataTipChildWnd - Overrides some functionality of the base data tip to support modified
behavior of child data tips. One example of this behavior is out-of-bounds testing. For child
data tips, the out-of-bounds border is much larger than it is for top-level tips.
//********************
class CDataTipChildWnd : public CDataTipWnd
{
};
```

In one embodiment, a data tip may be displayed by a method where the debugger editor calls a function requesting a data tip. The debugger creates an instance of CDataTipWnd and initializes it with the appropriate expression and data and then returns a specific success code, but no data tip string. This success code is a queue for the editor to do some more analysis of other items it might need to display. For example, the request may result in a requirement to display a smart-tags for editing of the users code. If the editor determines that a data tip would be most appropriate, it calls back into the debugger through an interface called IVsCustomDataTip. This interface has only one method on it called Display-DataTip( ). The implementation of this function may be as shown in this example:

```
HRESULT CDebugger::DisplayDataTip( )
{
    if (m_pDataTipWnd)
    {
        CPoint ptCursor;
        GetCursorPos(&ptCursor);
        CRect rectExpression;
        CDataTipWnd::GetExpressionRect(&rectExpression);
        CPoint ptTip(ptCursor.x, rectExpression.bottom – 2);
        CSize size(0,0);
        if (m_pDataTipWnd->CreateTipWindow(CRect(ptTip, size)))
        {
            m_pDataTipWnd->ShowWindow(SW_SHOWNA);
        }
    }
    return S_OK;
}
```

At this point the enhanced data tip may be shown as a modal window, like, for example, a dialog. However, instead of requiring dismissal via an OK button, the enhanced data tip watches the user interface pointer mechanism, such as a mouse pointer, and determines from the user pointer position whether the data tip should be dismissed. The dismissal of data tips may be user pointer sensitive and/or keystroke sensitive for ease of use.

In one embodiment, if a data tip is top-level (parent) and has not been expanded, then there may be a small out-of-bounds border around the entire data tip. In addition, the bounding rectangle of the expression being evaluated is considered in-bounds. This border may be large enough to allow the cursor to be moved over the data tip and around the outside of it. However, it may also be small enough such that if the user moves the cursor to the next line of code, the data tip will be considered out of bounds and may be made to disappear. This type of hit-testing makes a top-level or parent data tip act very much like the heritage-type data tips. However, if the user expands a data tip, the out-of-bounds area may be greatly expanded since it may be assumed that the user intends on more examination. In this instance, accidental dismissal of a data tip may therefore be avoided. It may be noted that the boundaries border not only includes the data tip and any sub tier data tips, but may also include the bounding rectangle of the original object that was used to originate the first data tip. So, for an exemplary expression of "c.foo", the user may be able to move a mouse within the text of the expression itself, without having the data tip dismiss. However, it is contemplated that if the user were to just hover over the "c" in the "c.foo" expression, the bounding rectangle may be limited to the area around just the "c", not the entire expression "c.foo".

Figure 9:
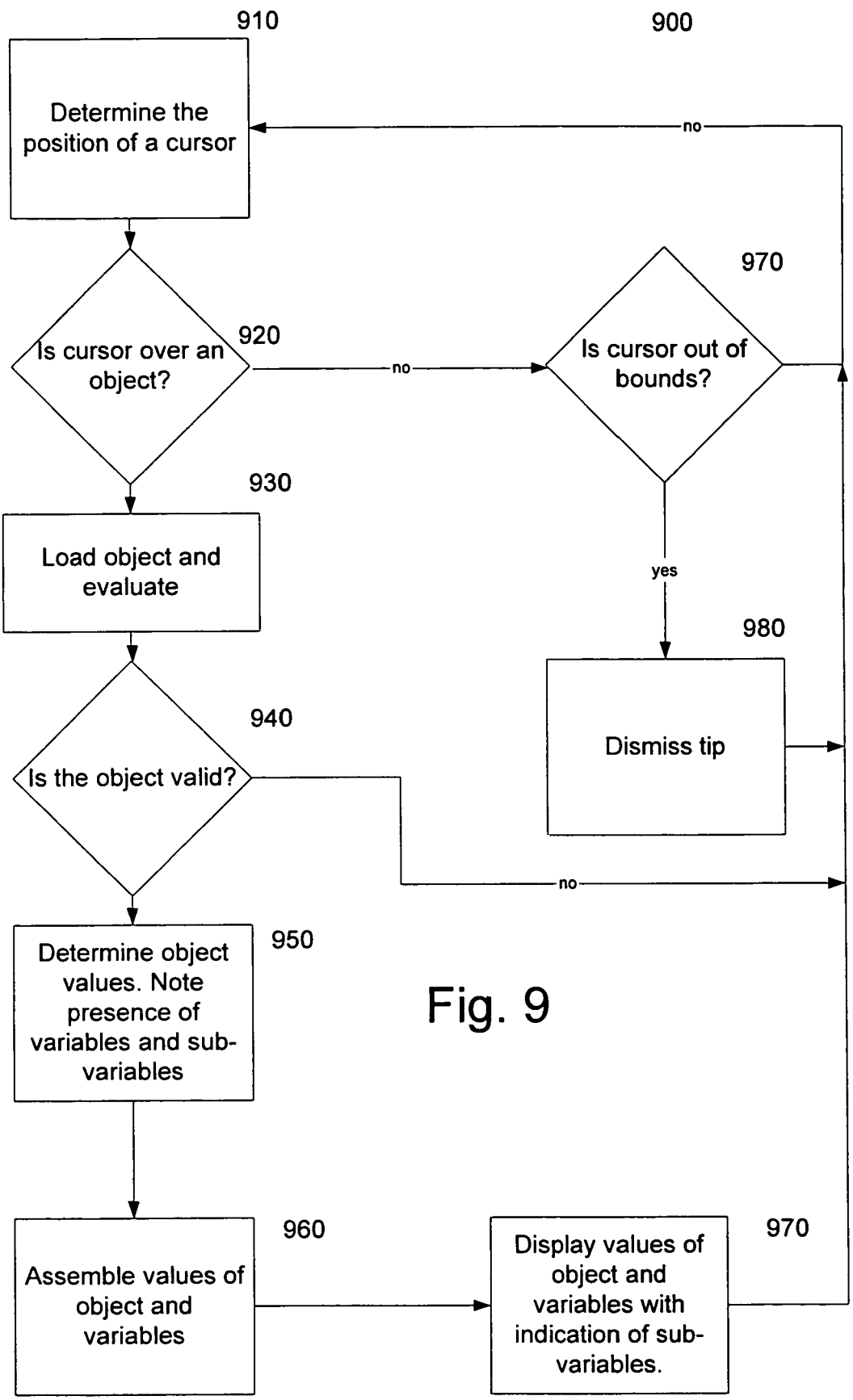
FIG. 9 is an exemplary flow diagram depicting a method of display for aspects of the current invention.

FIG. 9 illustrates the basic method 900 of the invention in displaying a data tip. Initially, the cursor position, or other pointer utilized by the user, is determined 910. The cursor position is examined 920 to determine if the cursor is within an area represented by an object of interest such as an equation or other object subject to evaluation for value. If the object is one that can be evaluated to represent a value, then the object is loaded and further evaluated 930.

The object may be further evaluated 940 to determine if it is a valid object for evaluation. If it is a valid object, the object values are determined 950 and a determination is made as to whether the object contains child variables, or whether it has other lower-tier variables or expressions. The values of these variables and child variables are assembled 960 for display. A data tip window may then be constructed and displayed 970, showing any variable values, and an indication of whether there are lower-tier variables that are subject to further evaluation and expansion.

At this point the user has options has discussed hereinabove as to whether he wishes to further expand the data tip window, dismiss it, make the data tip transparent, or seek a new data tip associated with another screen object. For example, if a data tip is present, but the user wishes to dismiss the tip, the process 900 monitors the location of the cursor 910, determines that the cursor may not be over an object 920 and determines that the cursor is out of bounds 970 because the user has moved the cursor out of bounds. As a result the data tip may be dismissed 980 and a new data tip may be brought forth if the user places the cursor over an object.

As mentioned above, while exemplary embodiments of the present invention have been described in connection with various computing devices and network architectures, the underlying concepts may be applied to any computing device or system in which it is desirable to implement a method or system to display information in the form of an interactive data tip. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method of avoiding pop-up windows and excessive scrolling while displaying data sub-items corresponding to an object displayed on a computer screen, the method comprising:
    determining that a cursor is initially hovering over the object on the computer screen, wherein the object represents a variable incorporated into a line of program code that is currently displayed on the computer screen;
    evaluating the object to determine if the object:
        has a variable value; and
        has related data sub-items;
    assembling variable values for the object and the related data sub-items; and
    generating an expansion tree of data tips incorporating an auto-expansion feature, the auto-expansion feature comprising:
        displaying on the computer screen the values of the object in a parent data tip, the parent data tip containing a first expansion widget indicator of the related data sub-items;
        determining that the cursor is next hovering over the first expansion widget indicator, and automatically launching a first child data tip that is a part of the expansion tree of data tips, the first child data tip displaying the related data sub-items together with associated data values for each individual data sub-item; and
        automatically dismissing the first child data tip upon determining that the cursor has been moved out of the first child data tip and is hovering inside the parent data tip.

2. The method of claim 1, further comprising allowing the displayed values to become temporarily transparent allowing visual examination of underlying displayed information without dismissing the parent data tip and the first child data tip.

3. A system for displaying an expansion tree of data tips related to an object displayed on a computer screen, the system comprising:
    a computer screen to display the object and the expansion tree of data tips;
        a processor for executing instructions corresponding to the method of:
    determining that a cursor is initially hovering over the object, wherein the object represents a variable incorporated into a line of program code;
    loading and evaluating the object to determine if the object:
        has a variable value associated with the variable; and
        has related data sub-items;
        if the related data sub-items are capable of expansion into lower-tier sub-items;
    assembling variable values for the object and the related data sub-items;
    displaying the variable values of the object in a parent data tip located adjacent to the cursor selected object; and
    determining that the cursor is next hovering over a first expansion widget indicator contained in the parent data tip, and automatically launching;
    a child data tip as an expansion data tip to the parent data tip, the child data tip window having a second expansion widget indicator associated with a first data sub-item contained inside the first child data tip; a third expansion widget indicator associated with a second data sub-item contained inside the first child data tip; and wherein upon determining that the cursor is hovering over one of the second or the third expansion widget indicators, a second child data tip is automatically launched as a part of the expansion tree of data tips; and automatically dismissing the first child data tip upon determining that the cursor has been moved outside the first child data tip.

4. The system of claim 3, wherein evaluating the object further comprises evaluating an expression associated with the object.

5. The system of claim 3, wherein displaying the values of the object further comprises displaying a variable associated with the object and values of the variable.

6. The system of claim 3, wherein the parent data tip becomes temporarily transparent upon request allowing visual examination of underlying displayed information without dismissing the parent data tip.

7. A machine-readable storage medium having instructions therein, executable by a machine to perform a method comprising:

determining that a cursor on a computer screen is positioned to point at the object, wherein the object represents a variable incorporated into a line of program code that is currently displayed on the computer screen;

loading the cursor-selected object;

evaluating the object to determine if the object:
has a variable value associated with the variable;
has related data sub-items; and
if the related data sub-items are capable of expansion into lower-tier sub-items;

assembling variable values for the object and the related data sub-items, wherein the object and the related data sub-items are related in a parent and child relationship; and generating an expansion tree of data tips incorporating an auto-expansion feature, the auto-expansion feature comprising:
displaying on the computer screen the variable values of the object in a parent data tip, the parent data tip containing a first expansion widget indicator of the related data sub-items;
determining that the cursor is next positioned to point to the first expansion widget indicator, and automatically launching a first child data tip that is a part of the expansion tree of data tips, the first child data tip including the lower-tier sub-items; and
automatically dismissing the first child data tip upon determining that the cursor has been moved outside the first child data tip.

8. A computer-implemented method for indicating on a computer display, the values of variables in a software program, the computer-implemented method comprising:

displaying on the computer display, an expression that is a part of the software program, the expression containing a variable;

detecting the positioning of a pointer upon the variable;

displaying thereon, a first data tip showing a first expanded version of the variable, the first expanded version showing at least one individual data element that defines the variable, together with a data value for the at least one individual data element;

detecting the positioning of the pointer upon an expansion widget contained in the first data tip;

automatically displaying thereon, a child data tip with at least a portion of the child data tip overlapping the parent data tip, in an expansion tree of interactive data tips that occupies less visible area on the computer display than an equivalent number of watch windows; and automatically dismissing the first child data tip upon determining that the cursor has been moved outside the first child data tip.

9. The method of claim 8, wherein the first child data tip shows a second expansion version of the variable, the second expanded version showing the at least one individual data element together with additional individual data elements that define the variable, the second expansion version further showing corresponding data values for each of the additional individual elements, wherein the corresponding data values are editable data values.

10. The method of claim 9, further comprising:
detecting the positioning of the pointer upon a first individual element inside the child data tip; and
automatically displaying thereon, an editing menu showing a list of editing operations that can be performed upon the first individual element contained in the child data tip.

11. The method of claim 10, wherein the list of editing operations comprises editing an editable data value corresponding to the first individual element contained in the child data tip.

12. The method of claim 11, wherein the editable data value is a numeric value.

13. The method of claim 11, wherein the editing operations comprise at least one of a) a copy operation, or b) a paste operation.

14. The method of claim 8, wherein the expression is displayed on the computer display as a result of execution of a breakpoint contained in the software program.

15. The method of claim 14, wherein the first variable is incorporated into the expression prior to the expression being displayed on the computer as a result of execution of the breakpoint.

16. The method of claim 8, wherein the first variable is a pre-existing element of the expression prior to the displaying of the expression on the computer.

17. The method of claim 1, wherein the line of program code is currently displayed on the computer screen as a result of execution of a breakpoint contained in the program code.

18. The method of claim 1, wherein the first child data tip comprises:
a second expansion widget indicator associated with a first data sub-item contained inside the first child data tip;
a third expansion widget indicator associated with a second data sub-item contained inside the first child data tip; and
wherein upon determining that the cursor is hovering over one of the second or third expansion widget indicators, a second child data tip is automatically launched as a part of the expansion tree of data tips.

19. The method of claim 18, wherein the first expansion widget indicator changes from a first status indication to a second status indication when the first child data tip is launched, the first status indication indicative of the object having related data sub-items hidden from view; and further wherein the second expansion widget indicator changes from a third status indication to a fourth status indication when the second child data tip is launched, the third status indication indicative of the first data sub-item having additional related data sub-items hidden from view.

20. The method of claim 1, wherein the first expansion widget indicator changes from a plus sign to a minus sign when the first child data tip is launched, the plus sign indicative of the object having related data sub-items hidden from view that can be viewed by launching the first child data tip.

* * * * *

UNITED STATES PATENT AND TRADEMARK OFFICE
CERTIFICATE OF CORRECTION

| | | |
|---|---|---|
| PATENT NO. | : 7,779,356 B2 | |
| APPLICATION NO. | : 10/723824 | |
| DATED | : August 17, 2010 | |
| INVENTOR(S) | : James P. Griesmer et al. | |

It is certified that error appears in the above-identified patent and that said Letters Patent is hereby corrected as shown below:

In column 14, line 56, in Claim 3, delete "cursor selected" and insert -- cursor-selected --, therefor.

In column 14, line 59, in Claim 3, delete "launching;" and insert -- launching --, therefor.

Signed and Sealed this
Twenty-second Day of February, 2011

David J. Kappos
*Director of the United States Patent and Trademark Office*